(12) United States Patent
Yamaguchi

(10) Patent No.: US 6,717,304 B1
(45) Date of Patent: Apr. 6, 2004

(54) MAGNETIC ASSEMBLY STRUCTURE USED FOR COMPACT ELECTRIC APPARATUS AND COMPACT ELECTRIC APPARATUS ADOPTING THE MAGNETIC ASSEMBLY STRUCTURE

(75) Inventor: Tadao Yamaguchi, Isesaki (JP)

(73) Assignee: Tokyo Parts Industrial Co., Ltd., Gunma-ken (JP)

( * ) Notice: Subject to any disclaimer, the term of this patent is extended or adjusted under 35 U.S.C. 154(b) by 77 days.

(21) Appl. No.: 09/709,461

(22) Filed: Nov. 13, 2000

(30) Foreign Application Priority Data

Nov. 12, 1999 (JP) .............................. 11-322024

(51) Int. Cl.[7] .............................. H02K 7/06; H02K 7/10
(52) U.S. Cl. .............................. 310/81; 310/89; 310/71
(58) Field of Search .............................. 310/81, 71, 89, 310/254, 217, 218, 216

(56) References Cited

U.S. PATENT DOCUMENTS

| | | | | |
|---|---|---|---|---|
| 6,011,333 A | * | 1/2000 | Yamaguchi et al. | 310/81 |
| 6,051,900 A | * | 4/2000 | Yamaguchi | 310/81 |
| 6,246,143 B1 | * | 6/2001 | Yamaguchi | 310/233 |
| 6,384,498 B1 | * | 5/2002 | Yamaguchi et al. | 310/81 |
| 6,384,499 B2 | * | 5/2002 | Yamaguchi | 310/81 |

* cited by examiner

Primary Examiner—Thanh Lam
(74) Attorney, Agent, or Firm—Leydig, Voit & Mayer, Ltd.

(57) ABSTRACT

A magnetic assembly structure includes a magnetic yoke connected to a first lead frame and separated at a connection portion of the yoke, at least one solderable feeder terminal connected to a second lead frame thinner than the first lead frame and separated from the yoke at a connection portion of the second lead frame, at least one feeder terminal electrically insulated from the yoke, a resin base insulating the yoke from the terminal, the connection portion of the yoke not protruding outside the base, and an annular magnet surrounding the yoke.

9 Claims, 4 Drawing Sheets

MAGNETIC ASSEMBLY STRUCTURE USED FOR COMPACT ELECTRIC APPARATUS AND COMPACT ELECTRIC APPARATUS ADOPTING THE MAGNETIC ASSEMBLY STRUCTURE

BACKGROUND OF THE INVENTION

1. Field of the Invention

The present invention relates to a magnetic assembly structure used for a compact electric apparatus, a method of fabricating the magnetic assembly structure, and a compact electric apparatus adopting the magnetic assembly structure, and more particularly, in improvements to apparatus such as electroacoustic transducers and DC motors.

2. Description of the Related Art

It is well known that an electroacoustic transducer or a vibration motor which is a silent calling means can be used as an alarming source in a mobile communications apparatus. Both of these apparatus use a magnetic assembly structure.

When the magnetic assembly structure is used for an electroacoustic transducer, a pole piece located at the center of a yoke of a magnetic material on which a low profile cylindrical magnet is placed. A resin base is formed integrally with a plurality of feeder terminals. A previously wound air-core coil is inserted in the pole piece and end portions thereof are connected to the terminals by soldering.

To configure an electroacoustic transducer by using the magnetic assembly structure, a boss is integrally erected from the base at the outside of the low profile cylindrical magnet, and a vibratory plate of thin stainless steel or Permalloy™ including a magnetic material is placed on the boss portion. A case with a sound hole is covers the vibratory plate.

Also, as another example of the magnetic assembly structure used for a flat DC vibration motor, a shaft holder is installed at the center of a bracket of a magnetic material and also used as the yoke on which a low cylindrical magnet is placed, and a shaft is fixed to the shaft holder. Then, an eccentric rotor is rotatably installed on the shaft, and is covered by a low profile case.

However, according to recent trends in making a small and light mobile communications apparatus such as mobile phones and in the automation of assembly processes, magnetic assemblies are becoming more compact and an easy reflow soldering type is needed.

However, when the above magnetic assembly structure is used, the magnetic field may deteriorate due to high temperature during reflow soldering.

Also, according to recent trends in the automation of production processes and in low power consumption, the yoke and terminals are connected by a signal lead frame and integrally formed by using resin. Then, the connection portions therebetween are cut. Since the feeder terminal is formed of the same magnetic body (steel plate) as the yoke, the sectional surface of the feeder terminal may be corroded, making reflow soldering difficult. Also, since the feeder terminal is thick, solderability deteriorates. Accordingly, soldering for a longer time is needed so that the effect of thermal insulation is lowered.

Since the yoke serves as a magnetic path for the magnet, a yoke having a thickness at which the magnetic flux is not saturated is needed. Thus, it is not preferred to make the yoke by using a material having the same thickness as that of the feeder terminal.

SUMMARY OF THE INVENTION

To solve the above problems, it is an object of the present invention to provide a magnetic assembly structure having a superior reflow soldering feature considering thermal insulation of a magnet, in which the terminal is formed to be thin and easy to solder so that reflow soldering can be easily performed, and simultaneously, the yoke is formed to be appropriately thick to secure a magnetic path, a method of fabricating the magnetic assembly structure, and an electric apparatus using the magnetic assembly structure.

Accordingly, to achieve the above object, there is provided a magnetic assembly structure comprising a yoke formed of a magnetic material to be connected on a first lead frame and separated at a connection portion, at least one feeder terminal having an anticorrosion feature and exhibiting soderability, formed to be connected on a second lead frame thinner than the first lead frame and to be separated at a connection portion, at least one feeder terminal being arranged to be insulated from the yoke, a base formed of anti-solderability resin for insulating at least a part between the yoke and the terminal, in which the connection portion of the yoke to be separated is incorporated not to protrude outside, and a ring type magnet arranged above the yoke.

It is preferred in the present invention that the feeder terminal is formed of a thin German silver plate and the yoke is formed of a anti-corrosion processed steel plate.

Also, it is preferred in the present invention that the magnet is slightly separated from the yoke so that reflow soldering is possible.

Also, it is preferred in the present invention that the overall shape of the plan view is rectangular and a mounting portion including a feeder terminal is arranged at each corner of the rectangular shape.

Also, it is preferred in the present invention that the mounting portion including the feeder terminal does not protrude outside by the rectangular corners.

To achieve the above object, there is provided a method of fabricating a magnetic assembly structure which is achieved by forming a first lead frame by installing a plurality of yokes connected by connection portions at a predetermined pitch, forming a second lead frame by installing a plurality of yokes connected by connection portions at a predetermined pitch, insulating at least a part of the first and second lead frames and forming an integrated base out of anti-solderability resin by injection-molding, and separating each of installation portions to form the yoke and feeder terminal having a predetermined shape.

To achieve the above object, there is provided an electric apparatus including a magnetic assembly structure which comprises a yoke formed of a magnetic material to be connected to a first lead frame and separated at a connection portion, at least one feeder terminal having an anticorrosion feature and exhibiting solderability, formed to be connected on a second lead frame thinner than the first lead frame and to be separated at a connection portion, at least one feeder terminal being arranged to be insulated from the yoke, a base for insulating at least a part between the yoke and the terminal, formed of anti-solderability resin into which the connection portion of the yoke to be separated is incorporated not to protrude outside, and a ring type magnet arranged above the yoke, wherein the electric apparatus is an electroacoustic transducer.

To achieve the above object, there is provided an electric apparatus including a magnetic assembly structure which comprises a yoke formed of a magnetic material to be connected on a first lead frame and separated at a connection portion, at least one feeder terminal having an anticorrosion feature and exhibiting soderability, formed to be connected on a second lead frame thinner than the first lead frame and to be separated at a connection portion, at least one feeder terminal being arranged to be insulated from the yoke, a base for insulating at least a part between the yoke and the terminal, formed of anti-solderability resin into which the connection portion of the yoke to be separated is incorporated not to protrude outside, and a ring type magnet arranged above the yoke, wherein the electric apparatus is a DC motor.

It is preferred in the present invention that the DC motor is a flat vibratory motor, the outside of the DC motor is formed of resin to be non-circular, and in which the feeder terminal is arranged in the corner of the DC motor and the outside of the DC motor is exposed laterally.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
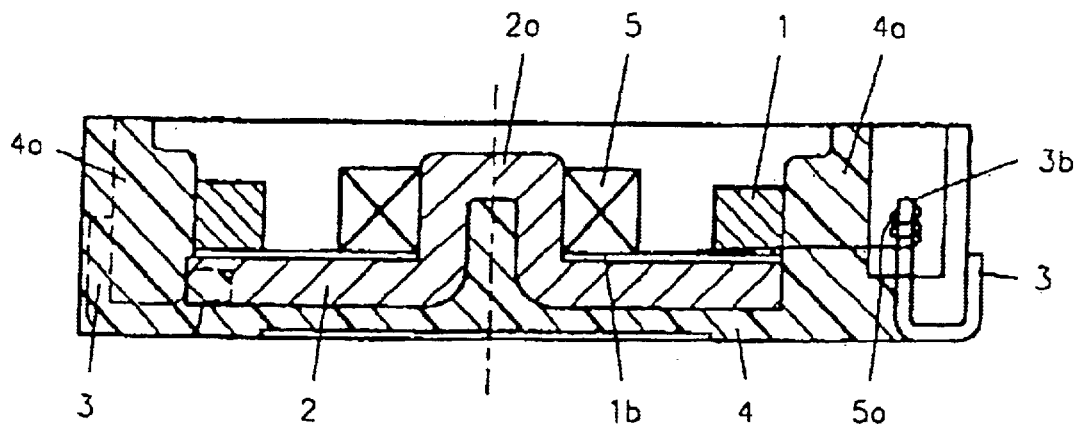
FIG. 1 is a sectional view, taken along line I—I of FIG. 4B described below, schematically showing a magnetic assembly structure according to a preferred embodiment of the present invention.
Figure 3:
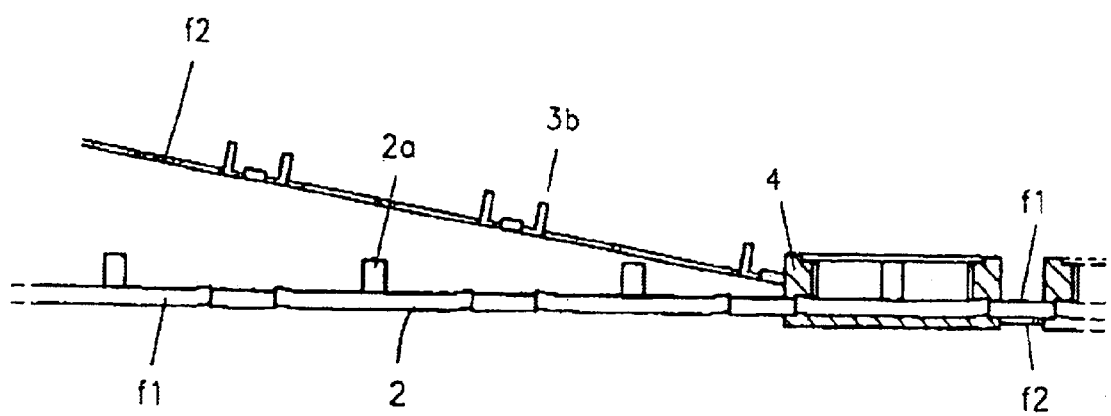
FIG. 3 is a view for explaining a method of fabricating the magnetic assembly structure of FIG. 1.
Figure 4A:
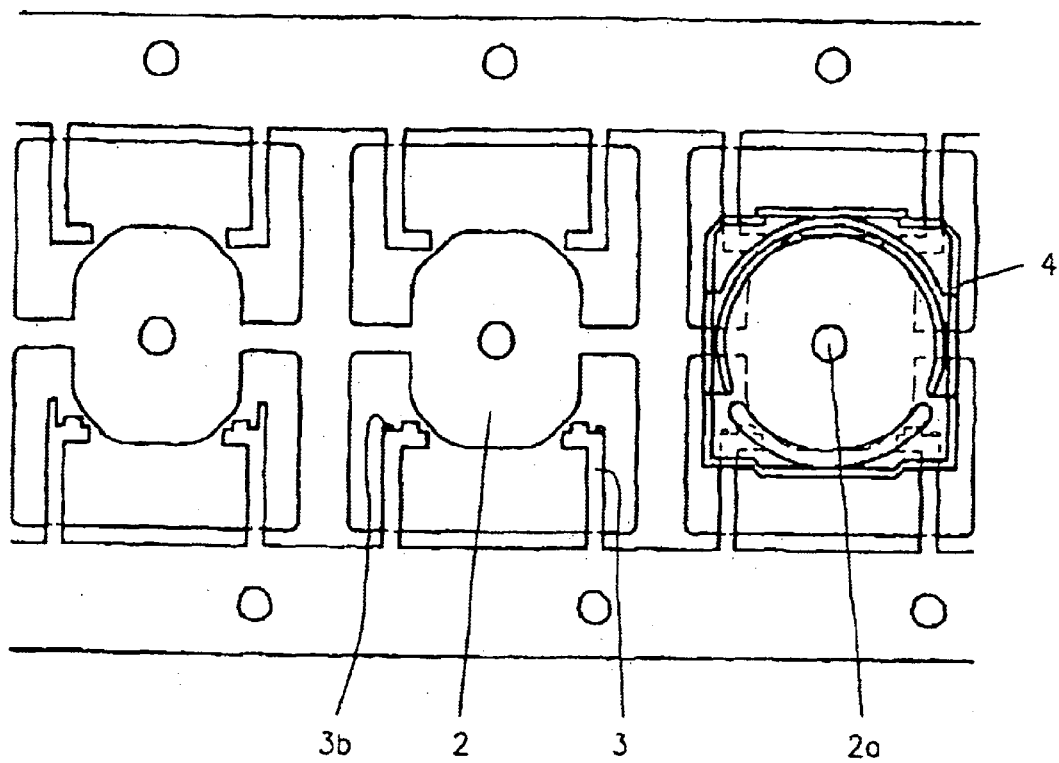
FIG. 4A is a plan view of first and second lead frames for explaining the method of fabricating the magnetic assembly strucutre.
Figure 4B:
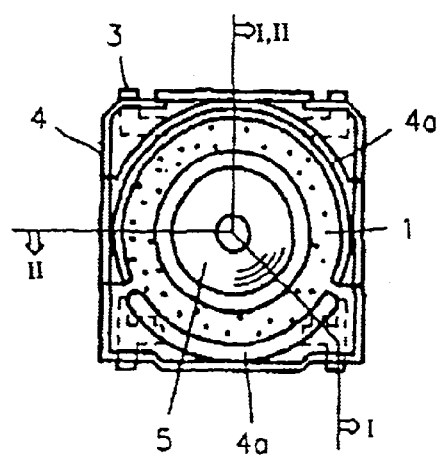
FIG. 4B is a plan view of one magnetic assembly structure unit separated from the first and second lead frames of FIG. 4A and integrally formed by using liquid crystal resin.

Referring to FIG. 1, a magnetic assembly structure used for an electroacoustic transducer according to a preferred embodiment of the present invention includes a yoke 2 of a magnetic material to which a low profile cylindrical magnet 1 is attached via an acrylic based double-side adhesive member 1b. A pole piece 2a is erected at the center of the yoke 2. As shown in FIG. 3, a plurality of connected yokes 2 are mounted on a first lead frame f1 which is formed of galvanized sheet iron having a thickness of 0.35 through 0.5 mm, at a pitch of one unit magnetic assembly structure. A plurality of connected feeder terminals 3 are formed on a second lead frame f2 which is formed of a thin plate exhibiting a superior anticorrosion feature and solderability, such as German silver having a thickness of about 0.15 mm, at the same pitch as the yoke 2. The yoke 2 and the feeder terminal 3 of the first and second lead frames f1 and f2 are integrally formed with a plurality of feeder terminals 3 in a base 4 exhibiting anti-solderabilitiy, such as liquid crystal resin.

A previously wound air-core coil 5 is placed over and surrounds the pole piece 2a. An end 5a of the coil 5 passes under the magnet 1 and is wound around an end 3b of the feeder terminal 3. The end 5a extends inward from the feeder terminal 3 and is soldered to the end feeder terminal 3b. By such an inside connection, a means for protecting the end 5a feeder terminal which is a thin wire is not needed.

Figure 2:
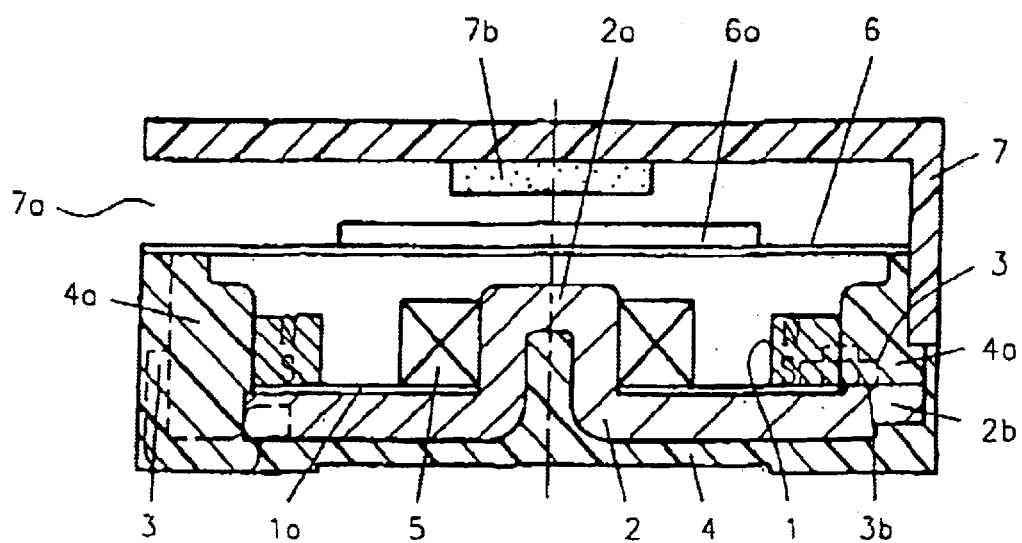
FIG. 2 is a sectional view, taken along line II—II of FIG. 4B described below, showing an electroacoustic transducer using the magnetic assembly structure of FIG. 1.

In order to configure an electroacoustic transducer by using the magnetic assembly structure having the magnet, as shown in FIG. 2, a vibratory plate 6 of a thin stainless steel plate with a centrally located magnetic material 6a is placed at the top of a boss 4a protruding from the base 4 at the outer circumferential side of the low profile cylindrical magnet 1. A case 7, formed of a thermally resistant resin with a sound hole 7a and a sponge restriction member 7b, covers the vibratory plate 6 and is ultrasonically welded. Then, a connection portion of the yoke 2 and a connection portion of the feeder terminal 3 are respectively cut so that a single electroacoustic transducer is obtained.

Also, to achieve thermal insulation during reflow soldering, a cut portion 2b of the yoke 2 does not protrude over the outer edge of the base 4 so that the bottom surface thereof is not contacted. Also, the sponge restriction member 7b has prevents deformation of the vibratory plate 6 when impacted.

To fabricate the magnetic assembly structure, the first lead frame f1 and the second lead frame f2, as shown in FIG. 3, are continuously supplied to a mold for molding the base 4, insulating at least one of the feeder terminals 3 from the yoke 2. Then, about twenty bases 4 having a desired shape are connected and integrally formed at the same time using liquid crystal resin exhibiting anti-solderability. Thereafter, the air-core coil 5 is installed, and the ends of the coil 5 are arranged and the magnet 1 is installed. Then, the connection portions are cut so that each of the feeder terminals 3 has a predetermined shape.

Figure 5:
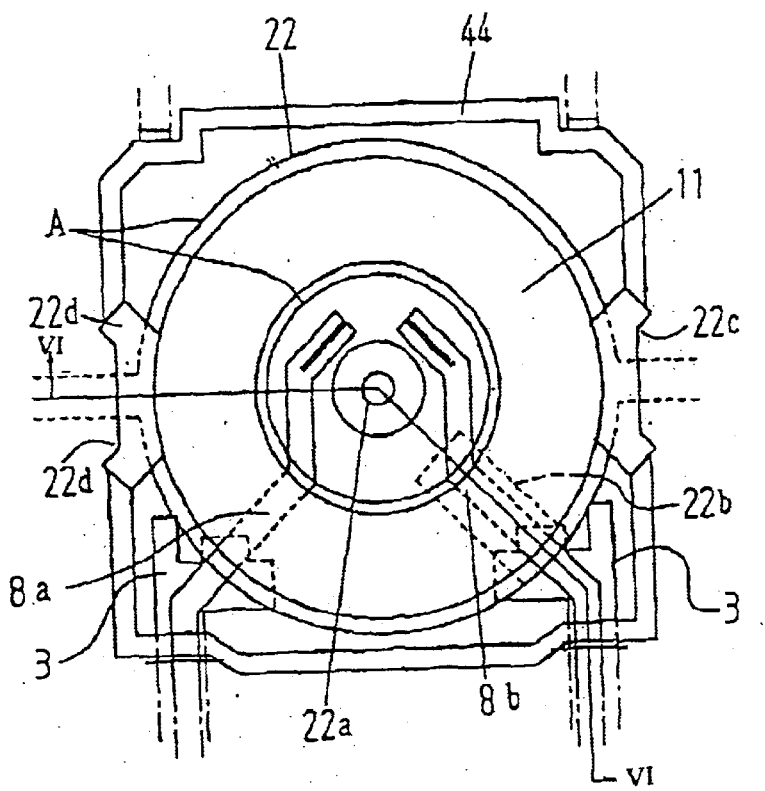
FIG. 5 is a plan view showing a magnetic assembly structure according to another preferred embodiment of the present invention.

Referring to FIG. 5, in a magnetic assembly structure used for a flat vibratory rotor according to another preferred embodiment of the present invention, a yoke of a magnetic material on which a low profile cylindrical magnet 11 is placed, has a shape of a bracket 22 and a shaft holder 22a is erected at the center of the bracket 22. The bracket 22 is separated from the first lead frame f1 formed of a galvanized sheet iron having a thickness of 0.35 through 0.5 mm as in the above-described embodiment, and has a plan view which is circular, together with a plurality of feeder terminals 3 including a dummy terminal. The feeder terminals 3 are separated from a second lead frame f2 of a thin plate member, for example, of thin German silver, having an anticorrosion feature and exhibiting superior solderability. Thus, the first and second lead frames f1 and f2 are incorporated into a base 44 of a liquid crystal resin exhibiting anti-solderability. Also, the feeder terminal arranged at each of the corners of the rectangle functioning as a mounting portion may be laterally exposed to the outside so that chucking is easily performed. Noble metal-clad resilient brushes 8a and 8b having a thickness of 0.05 mm, for example, are disposed in the inner diametric portion of the low profile cylindrical magnet 11. Base portions of the brushes 8a and 8b are disposed together with the feeder terminal 3 under the magnet 11. The magnet 11 is mounted on the bracket 22 with an acrylic adhesive A having a thickness of 0.15 mm on the upper surface of the brushes 8a and 8b. Here, the brushes 8a and 8b are separated from a third lead frame (not shown) to have a predetermined shape at the same pitch as the first and second lead frames f1 and f2, and are arranged together with the feeder terminal 3 at the base portion of the brushes 8a and 8b after the base 44 is molded.

Also, in this case, in order to insulate the brush 8b at one side, a clearance groove 22b is located at a neutral position of the magnet 11. Also, to insulate the bracket 22, a concave portion 22c is located where the connection portion is to be cut. Magnet arrangement guides 22d protrude and face one another.

Figure 6:
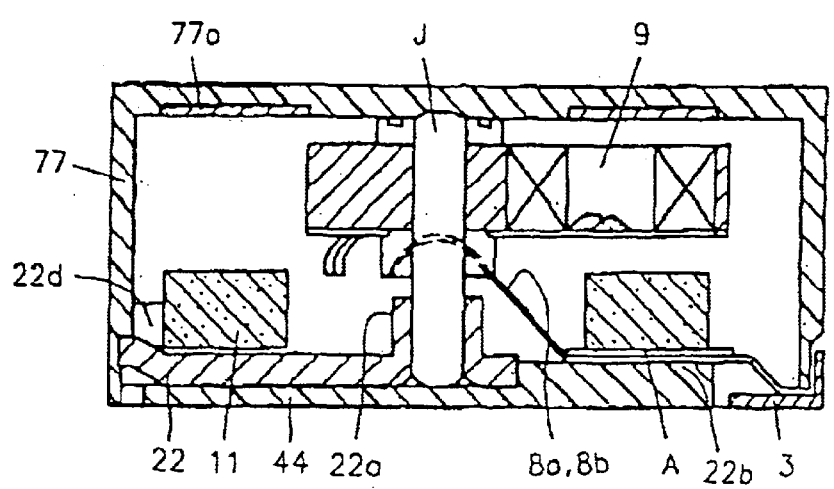
FIG. 6 is a sectional view, taken along line VI—VI of FIG. 5, showing a flat vibratory motor using the magnetic assembly structure according to the present invention.

To use the above magnetic assembly structure in a reflow flat vibratory motor, as shown in FIG. 6, a shaft J is fixed to the shaft holder 22a, and an eccentric rotor 9 is rotatably installed on the shaft J. A case 77 of thermal resistant resin providing thermal insulation, in which a return path plate 77a formed of a magnetic material to make a magnetic path at least facing the magnet 11, covers the magnetic assembly structure. Also, at least one of the feeder terminals 3 is insulated from the yoke 22.

Also, although a flat coreless vibratory motor having an eccentric rotor is described as a vibration source in the above preferred embodiments, the magnetic assembly structure can be adopted to a typical rotation type motor such as a pickup transfer motor in an MD player.

It is noted that the present invention is not limited to the preferred embodiment described above, and it is apparent that variations and modifications by those skilled in the art can be effected within the spirit and scope of the present invention defined in the appended claims.

As described above, in the magnetic assembly structure according to the present invention, the features thereof are not deteriorated and reflow soldering is simplified.

That is, the features are maintained by making the yoke have a predetermined thickness, and, since the feeder terminal can be made thin, reflow soldering can be easily performed.

The magnet can be insulated to a certain degree from heat during reflow soldering.

Chucking can be easily performed during automatic transfer.

The yoke is thick to maintain the feature thereof, and, since the feeder terminal can be made thin, a compact electrical part having a magnet enabling easy reflow soldering can be easily fabricated.

Since the yoke is thick to maintain the feature thereof, and the feeder terminal can be made thin, an electroacoustic transducer or a DC motor, particularly, a flat vibratory motor, in which reflow soldering can be simplified, can be realized.

Also, in a flat vibratory motor, since the outer side thereof is resin so that the shape in plan view is rectangular, the feeder terminal is arranged at a corner, and the outer surface is laterally exposed, the motor can be easily chucked or mounted on an automatic transfer machine and reflow soldering can be easily performed.

What is claimed is:

1. A magnetic assembly structure comprising:

first and second lead frames, the second lead frame being thinner than the first lead framed;

a magnetic yoke connected to the first lead frame and separated from the first lead frame at a connection portion of the yoke;

at least one solderable, non-corroding feeder terminal connected to the second lead frame and separated from the second lead frame at a connection portion of the second lead frame, at least one feeder terminal being electrically insulated from the yoke;

a resin base insulating the yoke from the feeder terminal, in which the connection portion of the yoke does not protrude beyond a surface of the base; and an annular magnet arranged about the yoke.

2. An electroacoustic transducer including a magnetic assembly structure comprising:

a magnetic yoke connected to a first lead frame and separated from the first lead frame at a connection portion of the yoke;

at least one solderable, non-corroding feeder terminal connected to a second lead frame and separated from the second lead frame at a connection portion of the second lead frame, at least one feeder terminal being electrically insulated from the yoke;

a resin base insulating the yoke from the terminal, the connection portion of the yoke not protruding beyond the base; and an annular magnet arranged about the yoke.

3. A DC motor including a magnetic assembly structure comprising:

a magnetic yoke connected to a first lead frame and separated from the first lead frame at a connection portion of the yoke;

at least one solderable non-corroding feeder terminal connected to a second lead frame and separated from the second lead frame at a connection portion of the second lead frame, at least one feeder terminal being electrically insulated from the yoke;

a resin base insulating the yoke from the terminal, the connection portion of the yoke not protruding beyond the base; and an annular magnet arranged about the yokes.

4. The structure as claimed in claim 1, wherein the feeder terminal is a German silver plate and the yoke is processed iron.

5. The structure as claimed in claim 4, wherein the magnet is separated from the yoke for reflow soldering.

6. The structure as claimed in claim 1, wherein the magnet is separated from the yoke for reflow soldering.

7. The structure as claimed in claim 1, wherein the structure has a rectangular shape and has a mounting portion including a feeder terminal at each corner of the rectangular shape.

8. The structure as claimed in claim 7, wherein the mounting portion including the feeder terminal does not protrude beyond the rectangular shape.

9. The DC motor as claimed in claim 3, wherein the DC motor is a flat vibratory motor, the base has a non-circular planar surface, the feeder terminal is located at a corner of the DC motor, and the DC motor is exposed laterally.

* * * * *